United States Patent [19]

Basstein

[11] Patent Number: 5,611,233
[45] Date of Patent: Mar. 18, 1997

[54] TRANSMISSION UNIT FOR DRIVING TWO SHAFTS LYING ESSENTIALLY PARALLEL

[75] Inventor: Augustinus F. H. Basstein, Prinsenbeek, Netherlands

[73] Assignee: Crown Gear, B.V., Rotterdam, Netherlands

[21] Appl. No.: 351,431

[22] PCT Filed: Jun. 8, 1993

[86] PCT No.: PCT/NL93/00123

§ 371 Date: Dec. 15, 1994

§ 102(e) Date: Dec. 15, 1994

[87] PCT Pub. No.: WO94/00705

PCT Pub. Date: Jan. 6, 1994

[30] Foreign Application Priority Data

Jun. 19, 1992 [NL] Netherlands ............................ 9201082

[51] Int. Cl.$^6$ ...................................................... B21B 35/14
[52] U.S. Cl. ................................ 72/249; 492/15; 74/397
[58] Field of Search ............................. 72/234, 235, 249, 72/248; 492/15; 74/396, 397

[56] References Cited

U.S. PATENT DOCUMENTS 4,132,099  1/1979  Elsener ........................................ 72/249

FOREIGN PATENT DOCUMENTS 538817   6/1922   France.
257849   3/1913   Germany.
6706440  11/1968  Netherlands.

*Primary Examiner*—Lowell A. Larson
*Assistant Examiner*—Thomas C. Schoeffler
*Attorney, Agent, or Firm*—Deveau, Colton & Marquis

[57] ABSTRACT

Transmission unit for driving two parallel shafts, at least one shaft being movable at right angles to its lengthwise direction, for example for a rolling mill (1). In this case each shaft (8, 11) is provided with a crown wheel (14, 15) which meshes with a cylindrical pinion (16), each pinion having a shaft (17) of which the axis intersects or crosses the axis of the shaft belonging to the crown wheel at right angles, and the rotations of the pinions being interconnected with a fixed transmission ratio. The cylindrical pinions can be fitted on one common shaft which can lie in the plane through the axes of the two shafts or at a fixed distance parallel to said plane, independent of the movement of one of the shafts or both shafts. Two pinions can be combined to form one pinion.

8 Claims, 3 Drawing Sheets

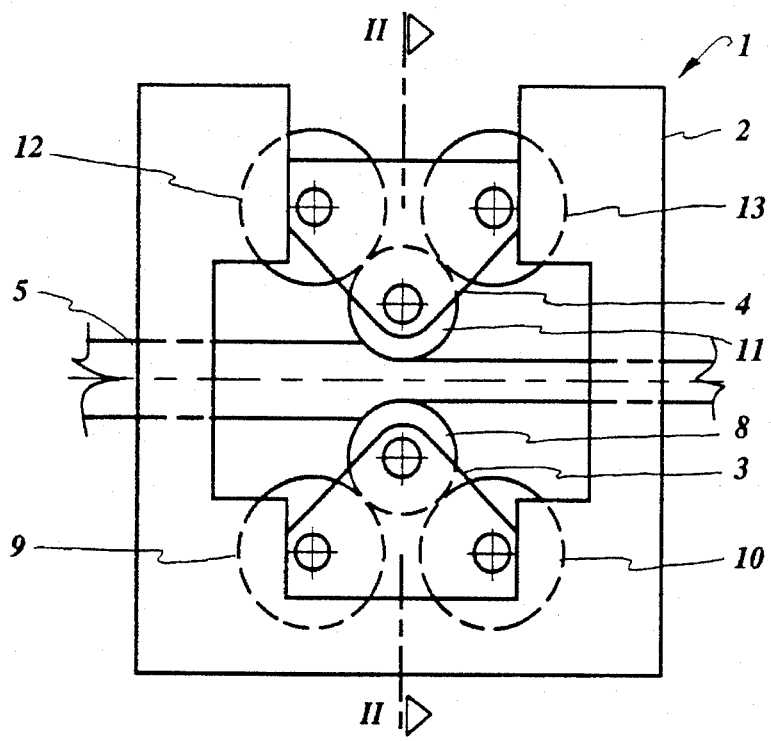
*Fig : 1*
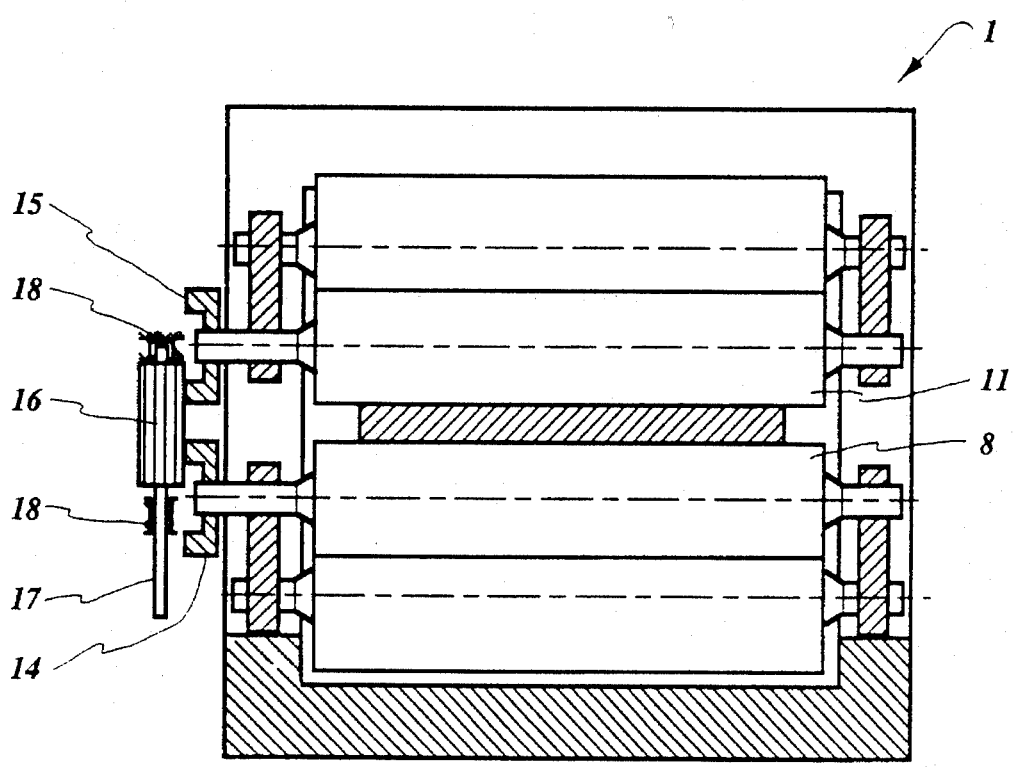
*Fig : 2*

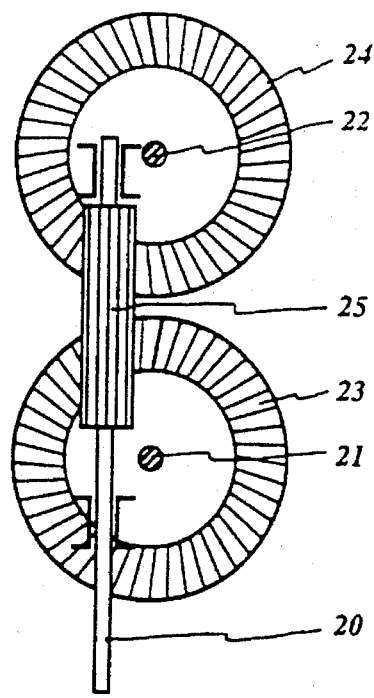
Fig : 3
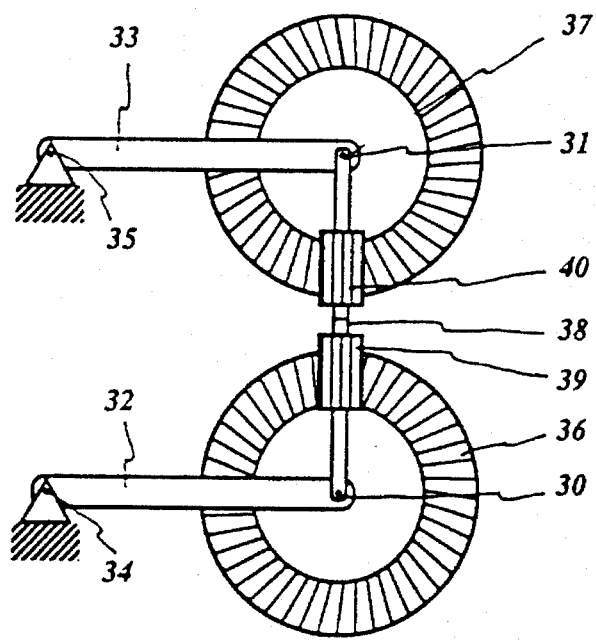
Fig : 4
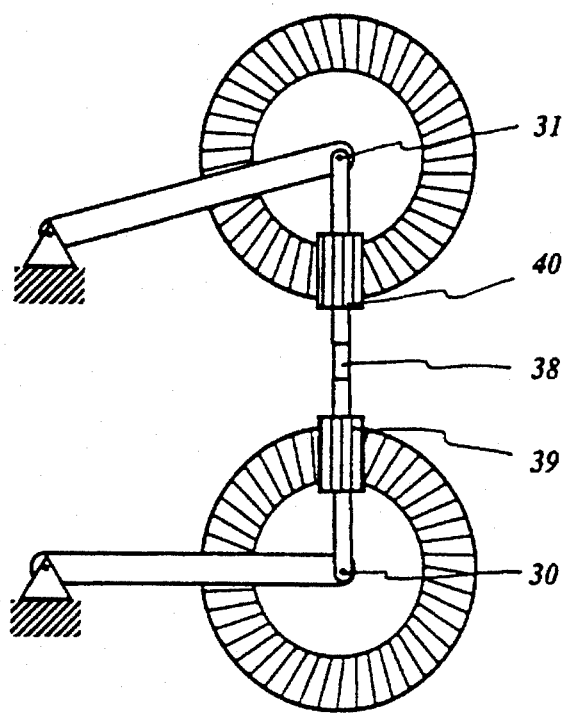
Fig : 5

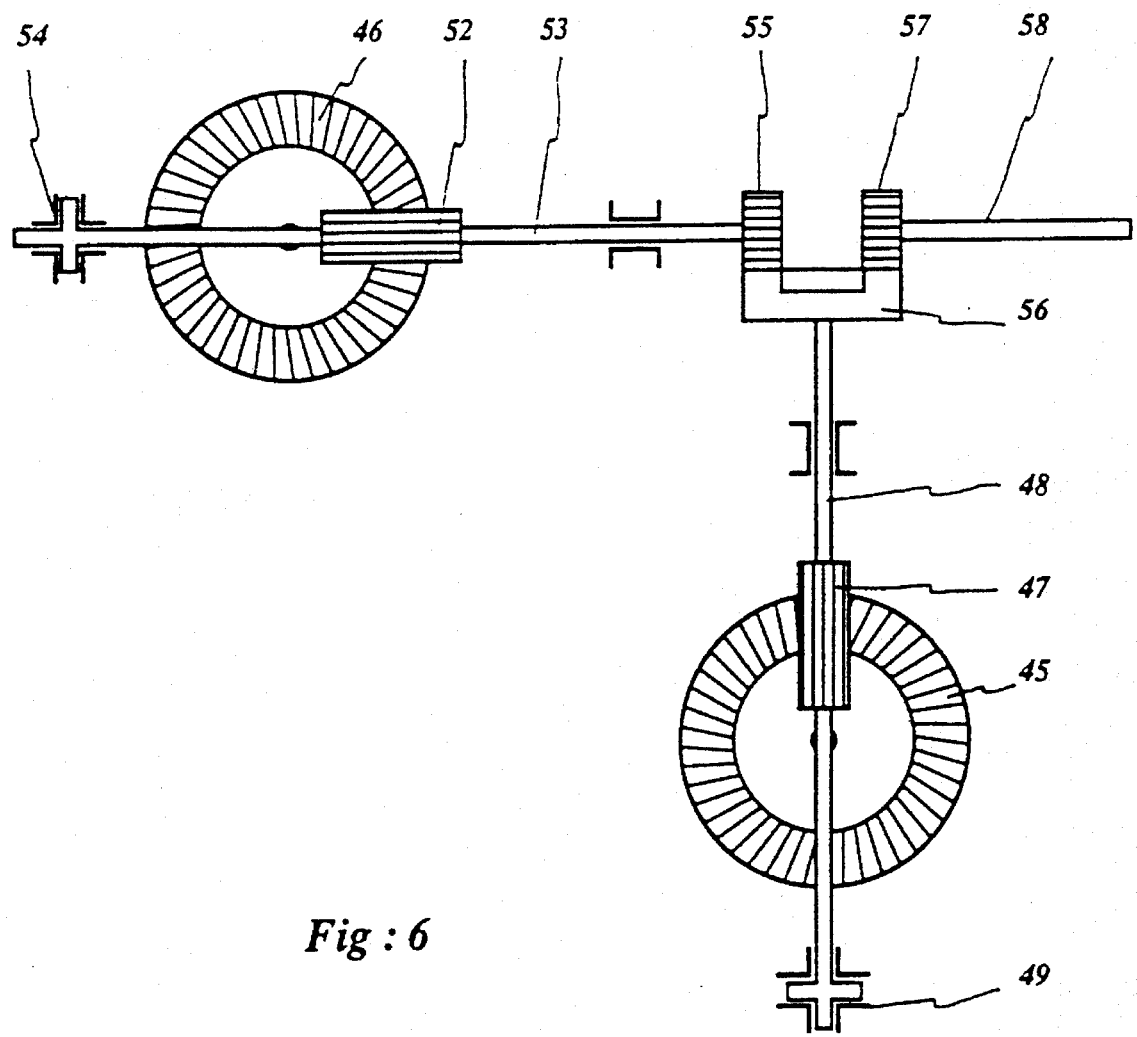
*Fig : 6*

5,611,233

TRANSMISSION UNIT FOR DRIVING TWO SHAFTS LYING ESSENTIALLY PARALLEL

The invention relates to a transmission unit for driving two shafts lying essentially parallel, at least one shaft being movable at right angles to its lengthwise direction.

Such a transmission unit is used for, for example, driving two rolls of a rolling mill, in which the rolls are movable relative to each other in order to adjust the desired rolling thickness. The two rolls are in this case driven by one common drive motor. The transmission unit between the drive motor and the two rolls can then consist of a gear transmission with intermediate gears and/or bevel gears. Such a transmission unit has the disadvantage that it is complex in construction and that the synchronisation between the shafts is effected by means of a long, weak gear train. Moreover, in the case of rolling mills the bottom roll is often immovably fixed in a frame, and the top roll is movable, the bottom roll being driven by means of a fixed drive shaft and the top roll by means of a drive shaft with homokinetic couplings. This has the disadvantage that the torque which can be transmitted by the drive shaft with the homokinetic couplings is limited, particularly in the case of large roll gap variations, and the torsional stiffness of said drive shaft is not satisfactory. Finally, such a transmission unit requires a large amount of space next to the rolling mill.

The object of the invention is to eliminate these disadvantages by means of a transmission unit of the type mentioned in the preamble which is characterised in that the shafts are each provided with a crown wheel which meshes with a cylindrical pinion, each pinion having a shaft of which the axis intersects or crosses the axis of the shaft belonging to the crown wheel at right angles, and the rotations of the pinions being interconnected with a fixed transmission ratio.

This arrangement ensures that when a shaft is moved, the crown wheel thereof remains meshed with the corresponding cylindrical pinion, with the result that the transmission ratio between the drive motor and the shafts to be driven and the synchronisation of said shafts do not change.

The cylindrical pinions are in this case preferably fitted on one common shaft, and the axis of said shaft lies in the plane through the axes of the two parallel shafts or at a fixed distance parallel to said plane, independent of the movement of one of the shafts or of both parallel shafts. If the shaft of the pinions lies at a distance from the plane through the axes of the two shafts to be driven, it is simple to accommodate the shafts to be driven at this side in a bearing. In this case the transmission which will take the greatest load is obtained if the direction of the tooth force on the crown wheel is towards the place where the pinion would mesh if the axis of the shaft of the pinions lay in the plane through the two axes.

Fitting the cylindrical pinions on a telescopic shaft ensures that a considerable range for moving the shafts to be driven is obtained. If such a large range is not necessary, two pinions can be combined to form one pinion with continuous toothing.

The invention will now be explained in greater detail with reference to the drawing, in which:

FIG. 1 shows diagrammatically a side view of a rolling mill which is provided with a first embodiment of a transmission unit according to the invention;

FIG. 2 shows diagrammatically a cross-section along line II—II in FIG. 1;

FIG. 3 shows diagrammatically a second embodiment of a transmission unit according to the invention;

FIG. 4 shows diagrammatically a third embodiment of a transmission unit according to the invention;

FIG. 5 shows diagrammatically the transmission unit from FIG. 4 in a changed position; and FIG. 6 shows diagrammatically a fourth embodiment of a transmission unit according to the invention.

FIG. 1 shows a rolling mill 1, comprising a frame 2, in which two roll bearing blocks 3, 4 are accommodated. The lower roll bearing block 3 is fixed immovably in the frame 2, while the upper roll bearing block 4 is movable vertically in the frame. In this way the rolling thickness of the product 5 to be rolled can be adjusted.

The lower roll bearing block 3 comprises a roll 8 and two supporting rolls 9, 10. The upper roll bearing block 4 comprises roll 11 and supporting rolls 12, 13.

FIG. 2 shows the transmission unit which makes it possible to drive both rolls 8, 11 with one drive motor (not shown). For this purpose, the rolls 8, 11 are provided with a crown wheel 14, 15 respectively. Both crown wheels 14, 15 are in mesh with a cylindrical pinion 16. The pinion 16 is immovably fixed on a drive shaft 17, which is accommodated immovably by means of a bearing 18 in the frame 2.

A movement of the rolls 8, 11 relative to each other, and thus relative to the pinion 16, produces no change in the transmission ratio, and the orientation of the rolls 8, 11 relative to each other also remains the same. Of course, it is also possible to make the two roll bearing blocks 3, 4 movable.

FIG. 3 shows a further embodiment of a transmission unit according to the invention, in which the axis of drive shaft 20 lies at a distance parallel to an imaginary plane through the axes of the shafts 21, 22. The shafts 21, 22 are provided with a crown wheel 23, 24 respectively, both of which are in mesh with cylindrical pinion 25, which is fixed on the drive shaft 20. With this arrangement, more space is provided at the side of the drive for the bearing of the shafts 21, 22 than in the case of the arrangement according to FIG. 2.

In FIGS. 4 and 5 the shafts 30, 31 are each coupled by means of a hinge rod 32, 33 to a fixed point 34, 35 of a frame of a device which is not shown, for example a rolling mill. For driving the shafts 30, 31, each shaft is provided with a crown wheel 36, 37. A telescopic shaft 38, the parts of which mesh with each other in a known manner, for example by means of a toothed coupling, is hingedly coupled at each end to the end of the shafts 30, 31. Two cylindrical pinions 39, 40 are fitted on the telescopic shaft 38.

When the shafts 30, 31 are moved apart from the position shown in FIG. 4 to the position in FIG. 5, the distance between the pinions 39, 40 will be able to increase. The drive of the two shafts can be achieved, for example, by direct driving of one of the two shafts or of the pinion belonging thereto. One of the shafts 30, 31 could also be accommodated at a fixed point in the frame, while the other shaft is movable. The direction of rotation of the one shaft relative to the other shaft (in the same direction, in the opposite direction) can be changed by making one of the two pinions 39, 40 mesh with the appropriate crown wheel at a point which lies diametrically opposite relative to the position shown in FIGS. 4, 5.

FIG. 6 shows a transmission unit for driving two rolls (not shown) which can be moved at right angles to each other, and which are provided with crown wheels 45, 46 respectively. Crown wheel 45 meshes with a pinion 47, which is immovably fixed on shaft 48. Bearing 49 ensures that the pinion 47 remains fixed in place. The crown wheel 46 also meshes with pinion 52 on shaft 53, which is accommodated in bearing 54. Crown wheel transmission 55, 56, 57 transmits the rotation of the shaft 58 driven by a drive motor (not shown) to the two crown wheels 45, 46. Here again, on movement of one of the two or both rolls, the synchronisation between them remains. According to the invention, it is also possible to drive several adjacent shafts which are movable in one common plane. The pinions can then all be fixed on one rotatable shaft.

A transmission unit according to the invention can also be used in situations in which the slidability of the shafts to be driven is desired only for absorbing manufacturing tolerances, for example, when driving interacting rotating displacement elements in pumps and/or compressors.

I claim:

1. A transmission unit for driving two parallel driven shafts each bearing a roll, the rolls defining a gap for passing through a material to be treated, each of said driven shafts rotating about its longitudinal axis, at least one of said driven shafts being movable at a right angle to its longitudinal axis for adjusting the size of the gap, characterized in that said transmission includes two cylindrical pinions, and said driven shafts are each provided with a crown wheel which meshes with a respective one of said pinions, each cylindrical pinion having a rotation axis which lies in a plane that intersects at right angles the longitudinal axis of said corresponding driven shaft, said at least one movable driven shaft being movable only in the direction of the rotation axis of said cylindrical pinion that meshes with the crown wheel provided on said driven shaft, and the rotations of said cylindrical pinions being interconnected with a fixed transmission ratio.

2. A transmission unit according to claim 1, further characterised in that said cylindrical pinions are fitted on a common shaft, the axis of said common shaft lying in a parallel plane which is parallel to the axes of said two parallel driven shafts independent of the movement of said parallel shafts.

3. A transmission unit according to claim 2, further characterised in that said common shaft is a telescopic shaft.

4. A transmission unit according to claim 2, wherein the parallel plane, in which the axis of said common shaft lies, also contains the axes of said two parallel driven shafts.

5. A transmission unit according to claim 2 wherein the parallel plane, in which the axis of said common shaft lies, is spaced from the axes of said two parallel shafts at a fixed distance.

6. A transmission unit for driving two parallel driven shafts each bearing a roll, the rolls defining a gap for passing through a material to be treated, each of said driven shafts rotating about its longitudinal axis, at least one of said driven shafts being movable at a right angle to its longitudinal axis for adjusting the size of the gap, wherein said transmission includes one cylindrical pinion with continuous toothing, and said driven shafts are each provided with a crown wheel which meshes with said cylindrical pinion, said cylindrical pinion having a rotation axis which lies in a plane that intersects at right angles the longitudinal axes of said driven shafts and in a parallel plane which is parallel to the axes of said two parallel driven shafts, said at least one movable driven shaft being movable only in the direction of the rotation axis of the cylindrical pinion.

7. A transmission unit according to claim 6 wherein the parallel plane, in which the rotation axis of said cylindrical pinion lies, also contains the axes of said two parallel driven shafts.

8. A transmission unit according to claim 6 wherein the parallel plane, in which the rotation axis of said cylindrical pinion lies, is spaced from the axes of said two parallel driven shafts at a fixed distance.

* * * * *